(12) United States Patent
Sercombe et al.

(10) Patent No.: US 11,374,452 B2
(45) Date of Patent: Jun. 28, 2022

(54) COOLING ARRANGEMENTS IN DEVICES OR COMPONENTS WITH WINDINGS

(71) Applicant: MAGNIX TECHNOLOGIES PTY LTD, Arundel (AU)

(72) Inventors: David Bruce Trowbridge Sercombe, Arundel (AU); Stuart Johnstone, Arundel (AU); John Alan Kells, Arundel (AU)

(73) Assignee: MAGNIX TECHNOLOGIES PTY LTD, Arundel (AU)

( * ) Notice: Subject to any disclaimer, the term of this patent is extended or adjusted under 35 U.S.C. 154(b) by 155 days.

(21) Appl. No.: 16/617,069

(22) PCT Filed: Jun. 4, 2018

(86) PCT No.: PCT/AU2018/050553
§ 371 (c)(1),
(2) Date: Nov. 26, 2019

(87) PCT Pub. No.: WO2018/218314
PCT Pub. Date: Dec. 6, 2018

(65) Prior Publication Data
US 2020/0169136 A1 May 28, 2020

(30) Foreign Application Priority Data
Jun. 2, 2017 (AU) ................ 2017902115

(51) Int. Cl.
*H02K 3/24* (2006.01)
*H02K 21/16* (2006.01)
(Continued)

(52) U.S. Cl.
CPC .............. *H02K 3/24* (2013.01); *H02K 1/146* (2013.01); *H02K 1/278* (2013.01); *H02K 21/16* (2013.01)

(58) Field of Classification Search
CPC .......... H01F 27/08; H02K 3/24; H02K 1/146; H02K 1/278; H02K 21/16; H02K 2203/12; H02K 9/00; H02K 9/005
(Continued)

(56) References Cited

U.S. PATENT DOCUMENTS 3,500,272 A    3/1970 Campbell et al.
3,983,427 A *  9/1976 Ulke ................ H02K 3/24
                                              310/61

(Continued)

FOREIGN PATENT DOCUMENTS

FR     2978631 A1    2/2013
WO  2012/101813 A1   8/2012
WO  2016067718 A1    5/2016

OTHER PUBLICATIONS

International Search Report and Written Opinion dated Jun. 29, 2018 issued in PCT/AU2018/050553.
(Continued)

*Primary Examiner* — Alex W Mok
(74) *Attorney, Agent, or Firm* — Scully Scott Murphy & Presser

(57) ABSTRACT

There is provided a winding system for use in an electrical, electronic or electromagnetic device or component including: one or more set of windings, each set of windings including an electrically-conductive element arranged in a winding pattern with multiple turns, at least one pair of adjacent turns of the multiple turns being spaced apart to provide at least one channel therebetween for coolant fluid to flow therethrough; and a housing for housing the set of windings, the housing including a fluid inlet and a fluid outlet each in fluid communication with the at least one channel, the housing facilitating coolant fluid to flow from the fluid inlet to the fluid outlet, via the at least one channel
(Continued)

in direct contact with exposed surfaces of the set of windings, the exposed surfaces at least partially defining the at least one channel.

25 Claims, 11 Drawing Sheets

(51) Int. Cl.
*H02K 1/27* (2022.01)
*H02K 1/14* (2006.01)
*H02K 1/278* (2022.01)

(58) Field of Classification Search
USPC .......................................................... 310/65
See application file for complete search history.

(56) References Cited

U.S. PATENT DOCUMENTS

| | | | |
|---|---|---|---|
| 4,956,626 A | 9/1990 | Hoppe et al. | |
| 4,994,700 A * | 2/1991 | Bansal | H02K 3/24 310/215 |
| 5,189,325 A * | 2/1993 | Jarczynski | H02K 9/19 310/54 |
| 5,329,197 A * | 7/1994 | Kudlacik | H02K 3/24 310/198 |
| 7,545,060 B2 * | 6/2009 | Ward | H02K 9/22 310/54 |
| 8,963,383 B2 * | 2/2015 | Lucchi | H02K 3/24 310/54 |
| 2002/0180284 A1 * | 12/2002 | LeFlem | H02K 3/47 310/54 |
| 2005/0162248 A1 | 7/2005 | Day et al. | |
| 2006/0043801 A1 * | 3/2006 | Adra | H02K 3/24 310/54 |
| 2007/0176499 A1 * | 8/2007 | Holmes | H02K 3/24 310/54 |
| 2008/0136271 A1 * | 6/2008 | Alfermann | H02K 3/24 310/53 |
| 2010/0072863 A1 * | 3/2010 | Robinson | H02K 3/24 310/60 A |
| 2013/0113311 A1 * | 5/2013 | Downing | H02K 1/32 310/59 |
| 2013/0147289 A1 * | 6/2013 | Burger | H02K 15/00 310/54 |
| 2014/0015353 A1 * | 1/2014 | Marvin | H02K 15/045 310/54 |
| 2014/0125167 A1 * | 5/2014 | Marvin | H02K 15/045 310/64 |
| 2014/0125188 A1 * | 5/2014 | Marvin | H02K 15/045 310/208 |
| 2014/0300220 A1 * | 10/2014 | Marvin | H02K 3/24 310/54 |
| 2014/0346778 A1 * | 11/2014 | Gabeiras | H02K 3/24 290/55 |
| 2016/0087509 A1 * | 3/2016 | Rippel | H02K 15/14 310/59 |
| 2016/0226327 A1 * | 8/2016 | Rippel | H02K 1/20 |
| 2016/0301286 A1 * | 10/2016 | Salter | H02K 3/48 |
| 2016/0322150 A1 | 11/2016 | Inaba et al. | |
| 2016/0322876 A1 * | 11/2016 | Horii | H02K 3/14 |
| 2017/0063200 A1 * | 3/2017 | Tremelling | H02K 3/38 |

OTHER PUBLICATIONS

Office Action in the United Kingdom dated Sep. 28, 2021 received in a corresponding foreign application, 4 pages.

Search Report in the United Kingdom dated Apr. 13, 2022 received in a corresponding foreign application, 5 pages.

* cited by examiner

COOLING ARRANGEMENTS IN DEVICES OR COMPONENTS WITH WINDINGS

FIELD OF THE DISCLOSURE

The present invention generally relates to electromagnetic, electromechanical, electronic or electrical devices or components and more particularly to arrangements for cooling concentrated or distributed windings in electromagnetic, electronic or electrical devices or components.

BACKGROUND

Many electromagnetic, electromechanical, electronic or electrical devices or components include one or more sets of windings. For example, an inductor includes coils to store magnetic energy in an electrical circuit. As another example, a transformer includes primary windings and secondary windings to step up or step down voltages via electromagnetic coupling between the two sets of windings. As yet another example, a motor or generator includes a stator and a rotor, one or both of which may have slots separated by teeth distributed about its circumference, with one or more coils wound around each tooth.

Generally speaking, winding patterns can be of two types—distributed or concentrated. In a distributed winding pattern, coils are wound in a partially overlapping configuration with one another around multiple teeth, whereas in a concentrated winding pattern, coils are wound around a single tooth. Concentrated winding machines have potentially more compact designs compared to distributed winding machines. Furthermore, this type of winding construction results in relatively short end turns on the windings, as compared with distributed windings. Only a small amount of length along the axis of the motor is devoted to windings end turns, and most of the length can include teeth and be directly useful for producing torque. Both types of machines can benefit from arrangements for cooling the windings.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE DISCLOSURE

According to a first aspect of the present disclosure, there is provided a winding system for use in an electrical, electronic or electromagnetic device or component including: one or more set of windings, each set of windings including an electrically-conductive element arranged in a winding pattern with multiple turns, at least one pair of adjacent turns of the multiple turns being spaced apart to provide at least one channel therebetween for coolant fluid to flow therethrough; and a housing for housing the set of windings, the housing including a fluid inlet and a fluid outlet each in fluid communication with the at least one channel, the housing facilitating coolant fluid to flow from the fluid inlet to the fluid outlet, via the at least one channel in direct contact with exposed surfaces of the set of windings, the exposed surfaces at least partially defining the at least one channel.

According to a second aspect of the present disclosure, there is provided a method of facilitating cooling in an electrical, electronic or electromagnetic device or component, the method including: arranging at least one set of windings in a winding pattern with multiple turns, each set of windings including an electrically conductive element; spacing apart at least one pair of adjacent turns of the multiple turns to provide at least one channel therebetween for coolant fluid to flow therethrough; housing the at least one set of windings in a housing, the housing including a fluid inlet and a fluid outlet in fluid communication with the at least one channel, the housing facilitating coolant fluid to flow from the fluid inlet to the fluid outlet, via the at least one channel in direct contact with exposed surfaces of the at least one set of windings, the exposed surfaces at least partially defining the at least one channel.

According to a third aspect of the present disclosure, there is provided an electromagnetic or electromechanical device, comprising: a cylindrical stator comprising a stator core and multiple teeth projecting radially inward from an inner periphery of the stator core; a rotor rotatably supported about a rotation axis and disposed inside the stator in opposed relation to an inner periphery of the stator with a gap; one or more sets of windings arranged about each tooth of the stator, each set of windings including an electrically-conductive element arranged in a winding pattern with multiple turns, at least one pair of adjacent turns of the multiple turns being spaced apart to provide at least one channel therebetween for coolant fluid to flow therethrough; inlet coolant fluid distribution module arranged at a first end of the stator and an outlet coolant fluid distribution module arranged at a second end of the stator, the r inlet and outlet coolant fluid distribution modules in fluid communication with the at least one channel such that coolant fluid entering the inlet coolant fluid distribution module is forced through the at least one channel and is in direct contact with exposed surfaces of the one or more set of windings defining the at least one channel and exits the at least one channel in the outlet coolant fluid distribution module.

Further aspects of the present disclosure and further embodiments of the aspects described in the preceding paragraphs will become apparent from the following description, given by way of example and with reference to the accompanying drawings.

DETAILED DESCRIPTION OF EMBODIMENTS

In the following description, for the purposes of explanation, numerous specific details are set forth in order to provide a thorough understanding of the present disclosure. It will be apparent, however, that the present disclosure may be practiced without these specific details. In some instances, well-known structures and devices are shown in block diagram form in order to avoid unnecessary obscuring.

Figure 1:
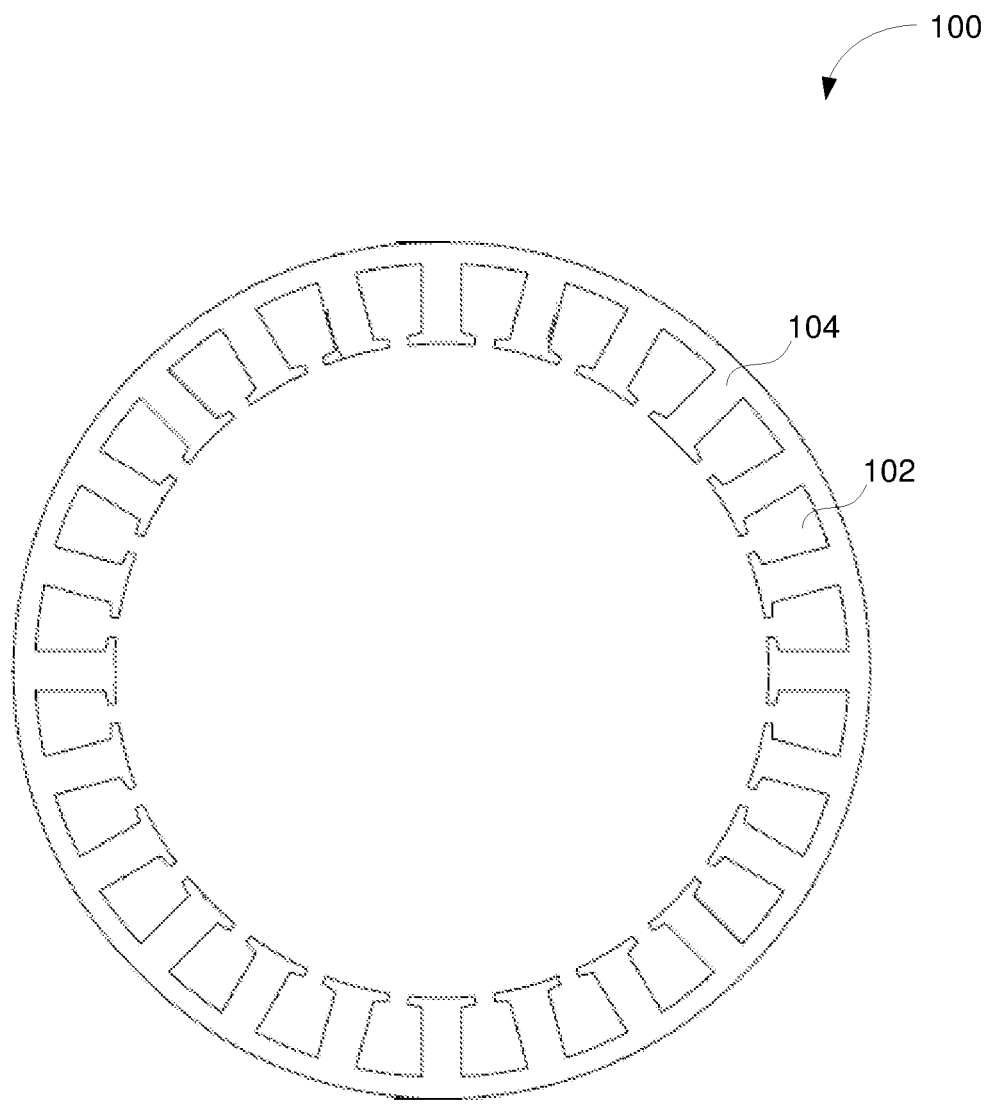
FIG. 1 illustrates an example stator of a concentrated winding machine.

FIG. 1 illustrates an example stator 100 of a concentrated winding machine in which embodiments of the present disclosure may be implemented. It will be appreciated that the illustrated stator 100 is merely exemplary and stators for concentrated winding machines may have different structures to that depicted in FIG. 1 and the aspects of the present disclosure may be implemented in any such stators without departing from the scope of the present disclosure. Furthermore, the concentrated winding machine may be a motor or a generator without departing from the scope of the present disclosure. Furthermore still, while parts of the following description are focussed on an electromagnetic machine (e.g. motor or a generator), a skilled person in the art would appreciate that, with minor modifications, such description is also applicable to other electronic, electrical or electromagnetic devices or components having concentrated windings or distributed windings. Such other electromagnetic or electronic devices or components include inductors, a transformers, loudspeaker motors, linear motors and antennae.

The stator 100 comprises a plurality of slots 102 (in the exemplary embodiment of FIG. 1, a total of twenty-four slots) on its inner walls, which are uniformly distributed about the circumference of the stator 100 and are defined by twenty four intervening teeth 104.

Figure 2A:
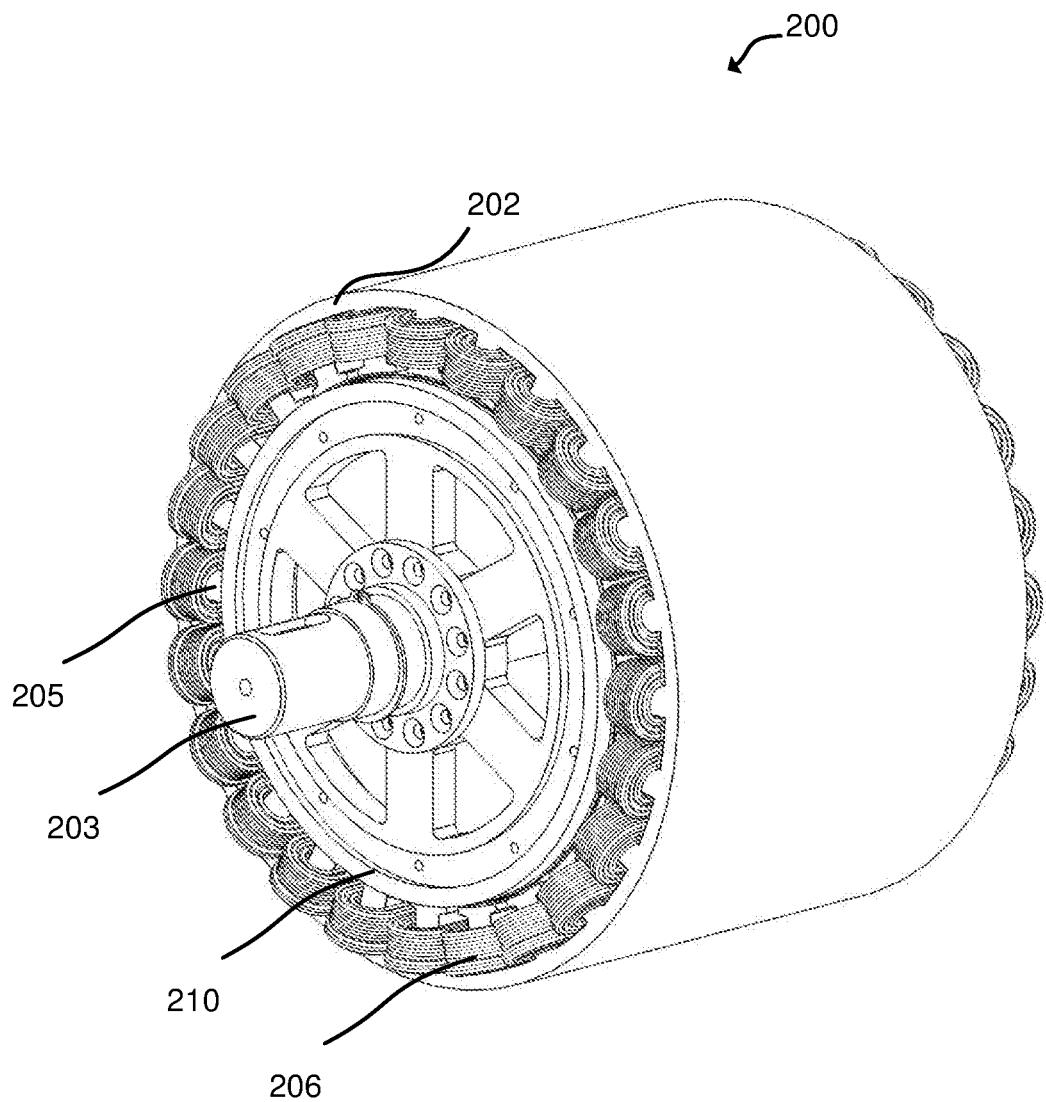
FIG. 2A illustrates an example electromagnetic device according to aspects of the present disclosure.
Figure 2B:
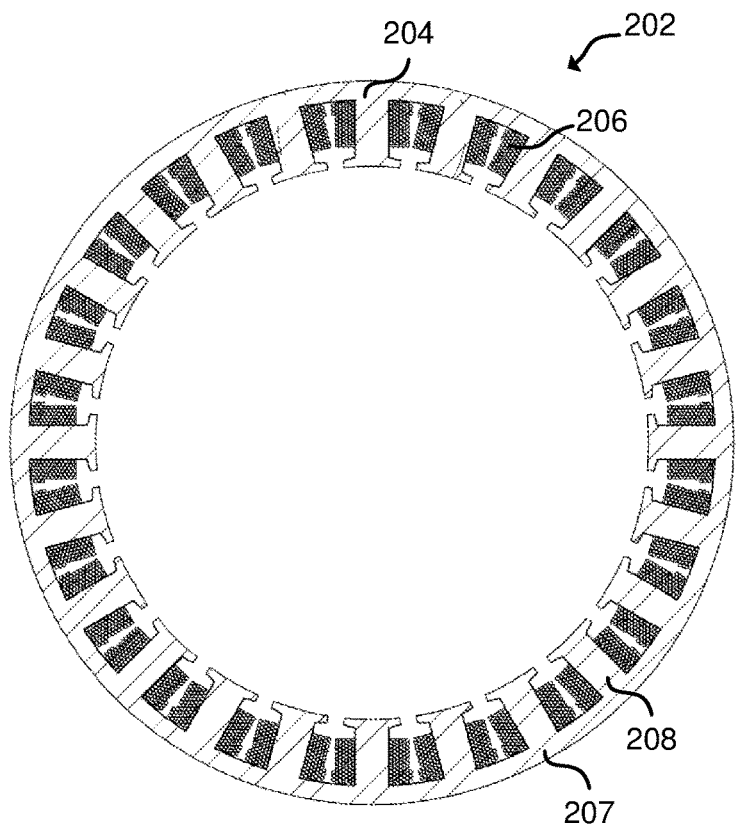
FIG. 2B illustrates a stator of the electromagnetic device of FIG. 2A.
Figure 2C:
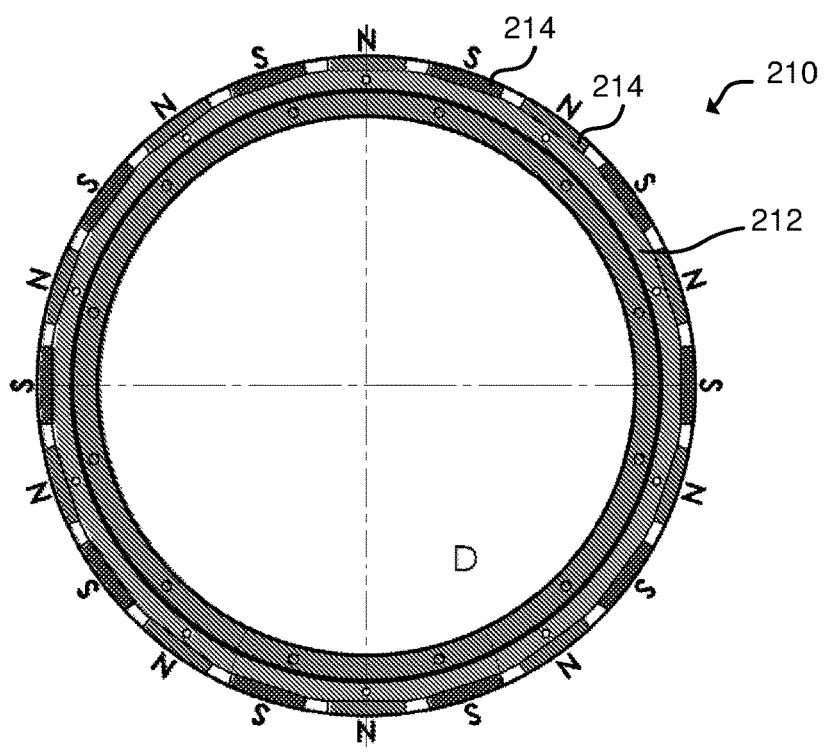
FIG. 2C illustrates a rotor of the electromagnetic device of FIG. 2A.

FIG. 2 illustrates an example electromagnetic device 200 (motor or generator). In particular, FIG. 2A illustrates the electromagnetic device 200, FIG. 2B illustrates a stator of the electromagnetic device 200 and FIG. 2C illustrates a rotor of the electromagnetic device 200.

In this particular example, the electromagnetic device 200 is a concentrated winding motor. It will be appreciated that this is merely exemplary and electromagnetic motors/generators may have different structures to that depicted in FIG. 2 and aspects of the present disclosure may be implemented in any such electromagnetic motors and/or generators without departing from the scope of the present disclosure. For example, the presently disclosed cooling systems may be employed in motors/generators with distributed windings.

The electromagnetic device 200 includes a stator 202 and a rotor 210 that is rotatably supported about a rotation axis on shaft 203 and disposed inside the stator 202 in opposed relation to an inner periphery of the stator 202 with a gap 205 left between them. The stator 202 and rotor 210 are disposed in a housing (not shown).

The stator 202 comprises a stator core 204 and a plurality of windings 206. The stator core 204 may be formed of a yoke portion 207 and multiple teeth 208 projecting radially inward from an inner periphery of the yoke portion 207 and are arranged at predetermined intervals in a circumferential direction. Slots are formed between every pair of adjacent teeth 208. These slots extend in the axial direction and have slot openings on the side facing the rotor 210. In the exemplary embodiment of FIG. 2, the stator has a total of twenty-four slots between the teeth 208 on its inner walls.

As seen in FIG. 2B, each winding set 206 includes an electrically conductive element wound around a tooth 208 in a concentrated-winding pattern. Each winding set 206 is partially fitted in the stator slots on both sides of a particular tooth 208. In some embodiments, the winding set 206 may be air-cored (i.e., the coils may be wound on nonmagnetic materials such as plastic or ceramic or not wound on any material). In other embodiments, it may be magnetic-cored (i.e., the coils may be wound on a magnetic material with a magnetic permeability greater than that of air such as ferrite or ferromagnetic material).

As described previously, the rotor 210 is disposed to face the stator 202 so as to be rotatable in the gap 205 intervening between the rotor 210 and the stator 202. The rotor 210 comprises a rotor core 212 and multiple poles 214 (twenty, in this embodiment) disposed on the outer surface of the rotor 210. In the presently disclosed embodiment, the poles of the rotor are made of permanent magnets. To accommodate the permanent magnets, an outer peripheral portion of the rotor core 212 includes a number of insertion recesses into which the permanent magnets can be fitted.

In the illustrated embodiment, the permanent magnets 214 are mounted on the rotor structure such that permanent magnets having S and N poles are alternately disposed in the circumferential direction such that two adjacent permanent magnets have opposite polarities. In some embodiments, the magnets are held to the surface of the rotor by a retention band made from high strength material such as carbon fibre.

To operate the motor, current is passed through the electrically-conductive element of the winding set 206. This current creates a magnetic field in the stator 202, which causes the rotor 210 to rotate in the gap 205.

When current is passed or passes through the electrically-conductive element of the winding set 206, the element generally heats up due to resistance and gradually dissipates the heat, for example via thermal conductance and convection to the surroundings. This heat effects the current carrying capacity of the electrically-conductive element and the insulation life of the winding, and may cause thermal runaway in the set of windings 206, thereby negatively affecting the performance of the machine. Therefore, to improve the performance of the machine (such as efficiency, power density, torque density, continuous operating limits and/or lifetime), it is desirable to rapidly and efficiently remove the dissipated heat from the winding set 206.

In order to increase the current carrying capacity of the electrically conducting element, a cooling system is employed. According to one such technique, a coolant, such as air or other fluid, is urged past the exposed surfaces of the winding set 206 in order to conduct and convect heat away from the winding set 206.

However, the total surface area exposed to the coolant is limited in relation to the total surface area of the conductors that form the winding. For example, in FIG. 2 or in the case of a winding set in which turns are closely spaced or contacting, the exposed surfaces of the intermediate coils (i.e., the turns excluding the top or bottom turns of the winding set 206) are limited to the outer narrow edge of the electrically conductive element. Especially for an edge-wound arrangement (see more below), it is recognised by contributor(s) of the present disclosure that there is a large thermally conductive path between the inner hot edge of a turn (which surrounds a tooth) and the outer cooler edge of the turn (which is exposed and can therefore be cooled by the coolant). In demanding applications this can lead to excessive temperatures in the electrically conductive element which can lead to reduced insulation life and thermal runaway.

To overcome one or more of these issues, aspects of the present disclosure disclose an exemplary winding system in which at least one pair of adjacent turns of the multiple turns of a winding pattern from one or more sets of windings are spaced apart to provide a channel between the at least one pair of adjacent turns. This channel allows a coolant (e.g., air or another fluid) to flow through. In what follows, examples of concentrated-winding machines are described. It should be apparent to a skilled person in the art that the following examples, with minor modifications, are also applicable to distributed-winding machines.

Winding System

Figure 3A:
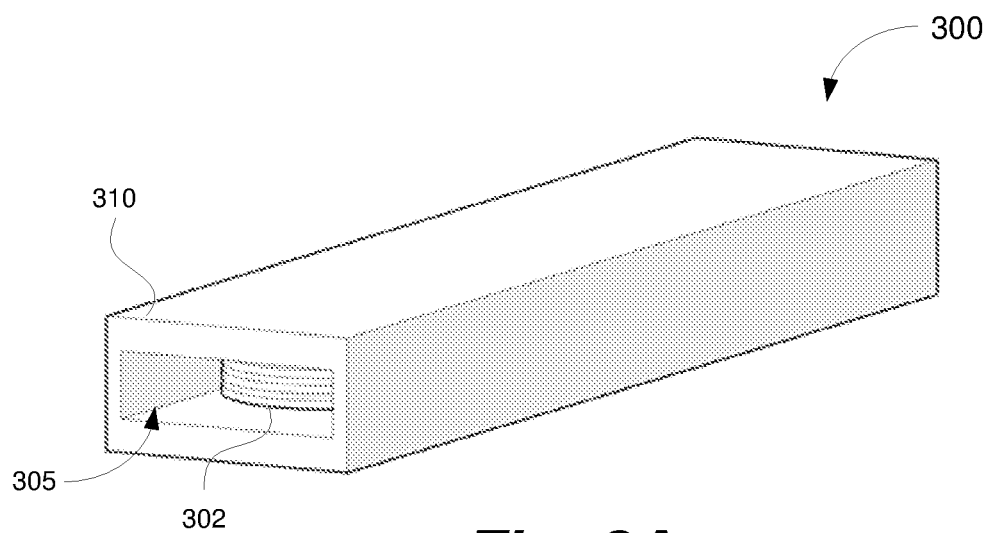
FIG. 3A illustrates a set of windings housed in a housing according to some examples of the present disclosure.
Figure 3B:
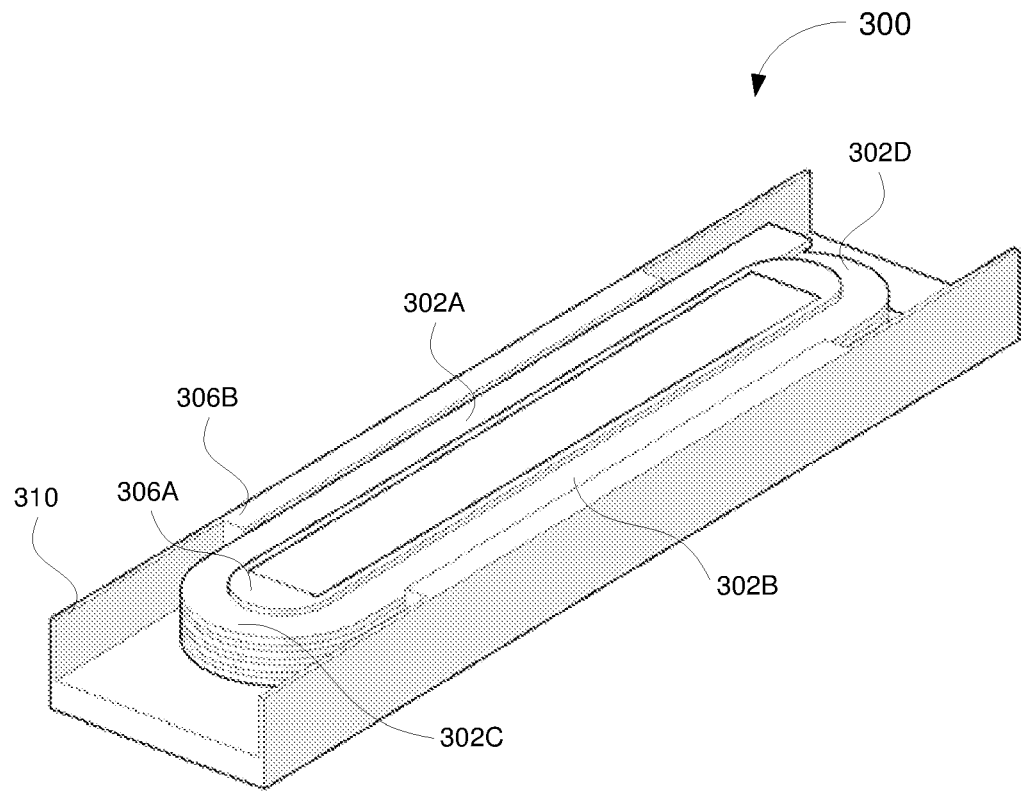
FIG. 3B illustrates the set of windings of FIG. 3A without a top portion of the housing.
Figure 3C:
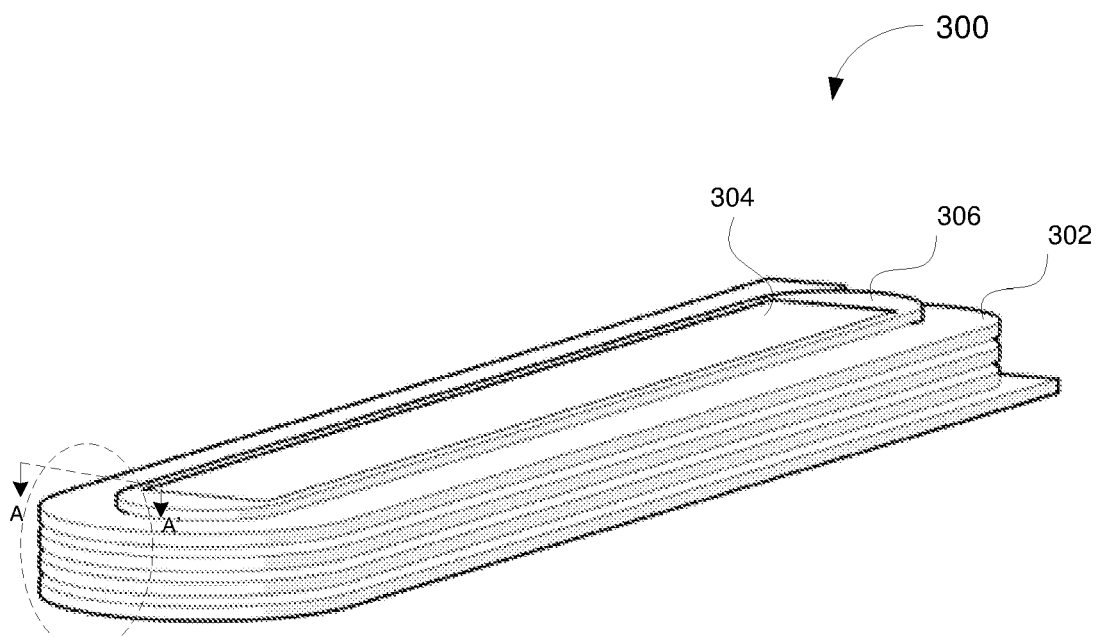
FIG. 3C illustrates the winding system of FIG. 3A without the housing according to some aspects of the present disclosure.
Figure 3D:
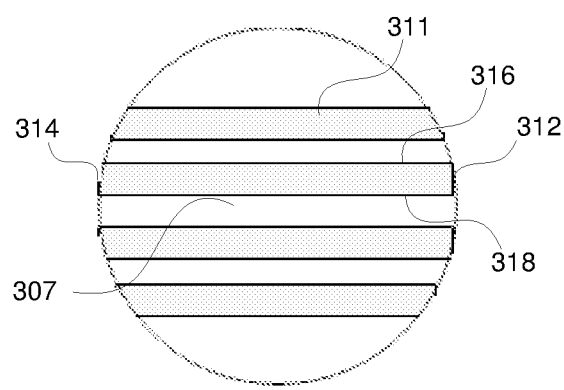
FIG. 3D illustrates a cross-section view of a portion of a set of windings of FIG. 3A.

FIGS. 3A-3D illustrate an example winding system 300 according to some aspects of the present disclosure. FIG. 3A, depicts the winding system 300 including a housing 310. FIG. 3B illustrates the winding system 300 without a top portion of the housing 310. FIG. 3C illustrates the winding system 300 without the housing 310. FIG. 3D illustrates a cross-section of a portion of the winding set 302. In the following sections, the winding system 300 is described with reference to FIGS. 3A-3D. The example winding system 300 may be applied, for instance, to each tooth of the concentrated winding machine in FIG. 1.

The winding system 300 includes a housing 310 and a set of windings 302 being housed in the housing 310. The winding set 302 includes an electrically conductive element wound around a core 304 (e.g. a tooth 208 in a concentrated winding machine 100) in a concentrated-winding pattern. The electrically conductive element may be made of materials such as copper or aluminium. In some embodiments, the electrically conductive element is an electrically superconducting element. In one arrangement, the electrically conductive element may be continuous over multiple turns (e.g. formed of a single conductor in a helical-like pattern). In an alternative example, the electrically conductive element may be non-continuous over the multiple turns (e.g. formed of multiple conductors in a stacked pattern), with each turn forming a separate closed loop (e.g. forming a racetrack or oval shape) or open loop (e.g. forming a C-shape). The winding set 302 may include an outer insulator, for example an insulating jacket or coating, surrounding the electrically-conductive element. The use of the outer insulator permits the use of a more electrically conductive fluid as the coolant. Otherwise the coolant is preferably a non-conducting or dielectric fluid.

The winding system 300 further includes a winding support 306 for supporting and separating the multiple turns. The separation of turns provides at least one channel 307 between each pair of adjacent turns of the winding set 302. In one example, the separation of each pair of adjacent turns provides two channels, one along each straight edge of a turn. In one example, the winding support 306 is a separate component from the housing 310. In this example, the winding support 306 includes an inner winding support 306A positioned between the core 304 and the winding set 302. Alternatively or additionally, the winding system 300 may further include an outer winding support 306B positioned between the winding set 302 and an inner wall of the housing 310. In another example, the coil support 306 is integral with the inner wall of the housing 310.

The housing 310 may form an outer casing or covering to house the winding system 300. As seen in FIG. 3A, the housing 310 includes a fluid inlet 305 and a fluid outlet (not shown) at opposite ends of the housing 310. The fluid inlet and outlet allows coolant to flow into and out of the housing 310, respectively.

In one arrangement, the winding set 302 is a ribbon-like, thin, generally continuous element having a thickness substantially less than the width of its major sides. In one example, such an element is wound by bending the wire about an axis parallel to the major sides thereof (i.e. flat wound). In another example, the element wire is wound by bending about an axis perpendicular to the major sides of the wire (i.e. edge wound).

The winding set 302 of FIGS. 3A-3D is obtained generally by bending the winding set 302 about axes perpendicular to the major sides of the wire (i.e., edge-wound). Edge-wound winding sets allow for greater volume of the conductor to be used within an available area increasing the 'packing factor' of the winding set. In the depicted examples, the winding set 302 is edge-wound multiple times such that each subsequent turn substantially overlaps the previous turn along its major side. Furthermore, in this example configuration, each turn of the winding set 302 includes two opposite straight portions 302A and 302B. In addition, each turn of winding set and two opposite curved portions 302C and 302D. Sides 302A, 302B, 302C and 302D together form a substantially racetrack or oblong shape.

FIG. 3D depicts a cross sectional view of a portion of the winding set 302 along axis AA'. As seen in this figure, a turn 311 of the element has an elongate cross-section with two narrow sides (i.e., at the inner edge 312 and outer edge 314) and two wide sides (i.e., at the upper edge 316 and lower edge 318). The turn 311 is bent about an axis perpendicular to its wide sides (i.e. 316) and wound around the core 304.

As described previously, the winding support 306 is configured to support and separate turns of the winding set 302 to provide at least one channel 307 between at least one pair of adjacent turns of the winding set 302. Referring to FIG. 3B, the winding 302 is wound around the inner winding support 306A such that a substantial portion of the inner side 312 of the winding set 302 is in contact with, or otherwise supported by, the inner coil support 306A. In the illustrated example, the outer winding support 306B extends less than the full length of the straight portions 302A and 302B of the turn 311.

The channel 307 provided between a pair of adjacent turns of the winding is at least partially defined by the lower surface of one turn, the upper surface of an adjacent turn. The channel 307 may be further defined by the inner support 306A and/or the outer support 306B or an inner wall of the housing 310.

Figure 4A:
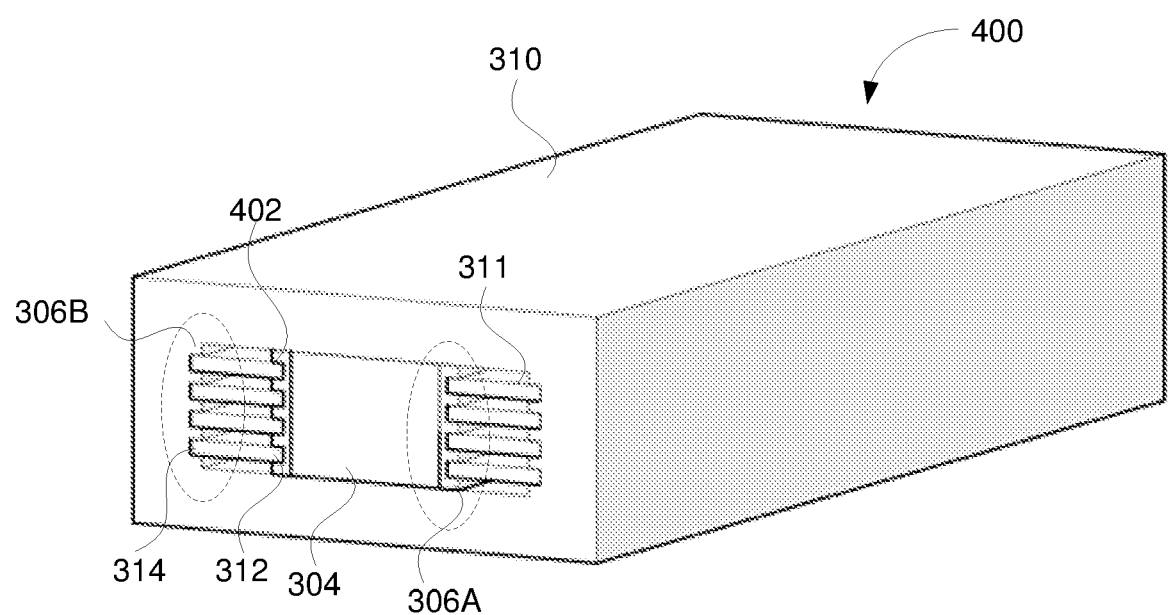
FIG. 4A is a sectioned view of the winding system of FIG. 3A according to some aspects of the present disclosure.
Figure 4B:
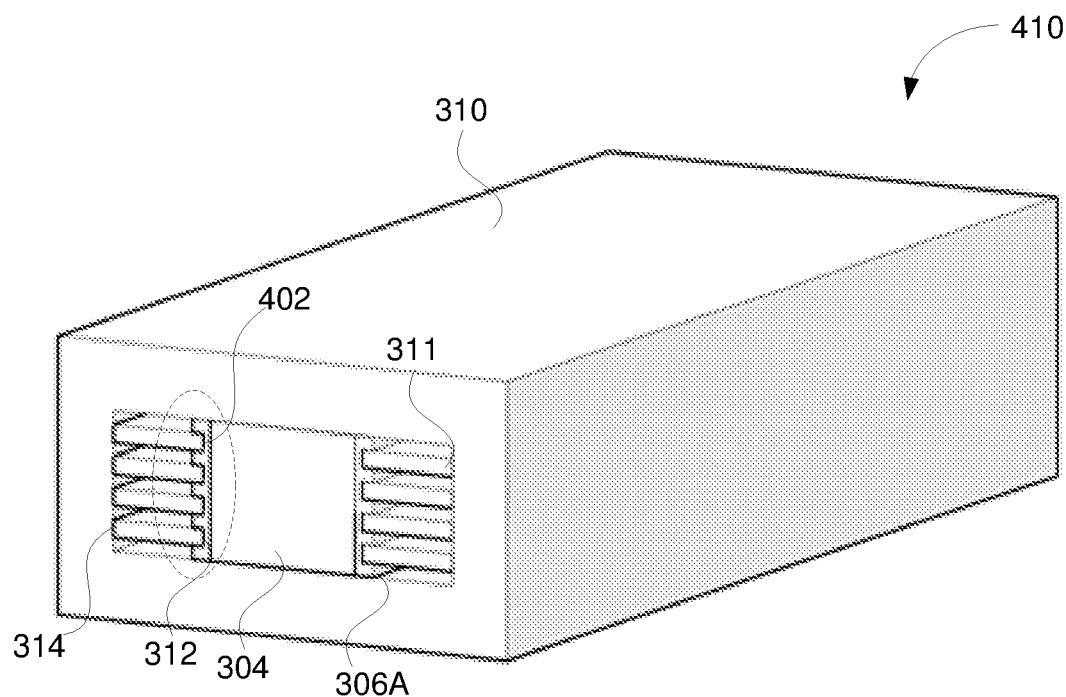
FIG. 4B is a sectioned view of the winding system of FIG. 3A according to some other aspects of the present disclosure.
Figure 4C:
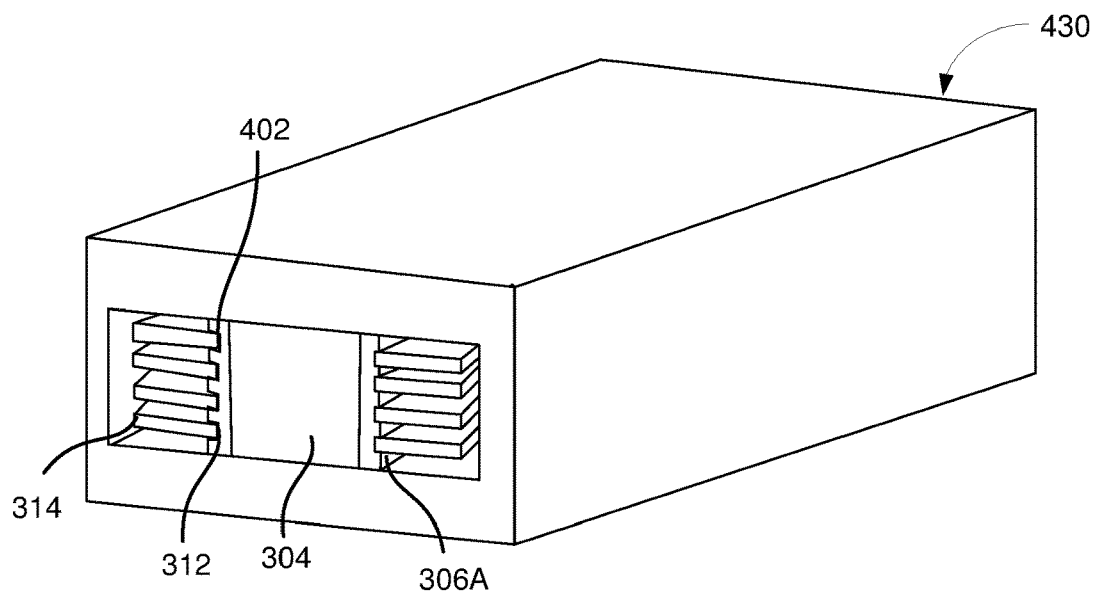
FIG. 4C is a sectioned view of the winding system of FIG. 3A according to some other aspects of the present disclosure.

FIGS. 4A, 4B, and 4C illustrate three different configurations of the winding support 306. Specifically, FIG. 4A illustrates an example configuration 400 in which the channels 307 between turns of the winding set 302 are provided by turn separation based on slots or protrusions in the inner winding support 306A and the outer winding support 306B. In this case, the outer surface of the inner support 306A and the inner surface of the outer support 306B include one or more protrusions or slots 402 extending along the periphery and/or length of the support (in the case of inner support 306A) or along the length of the support (in the case of the outer support 306B). The inner and outer edges 312 and 314 of each turn 311 can be positioned in the corresponding slots 402 of the inner winding support 306A and outer winding support 306B, respectively. In some embodiments, the protrusions and/or slots 402 extend only partially the length of the straight portions 302A and 302B. In other words, they do not extend the full length of the straight portions 302A and 302B.

In some embodiments, the protrusions/slots 402 in the inner and outer coil supports 306A and 306B (especially the portion of the protrusions/slots along the straight portions 302A and 302B of the winding) may be aligned so that when the conductor turns engage with these protrusions/slots, the conductor turns in this region are parallel or substantially parallel to each other. The portions of the inner winding support 306A that are in contact with the curved portions (especially portion 302D) of the winding may include slightly slanted or helical protrusions/slots allowing for the winding set 302 to extend from one turn to the next.

Figure 5:
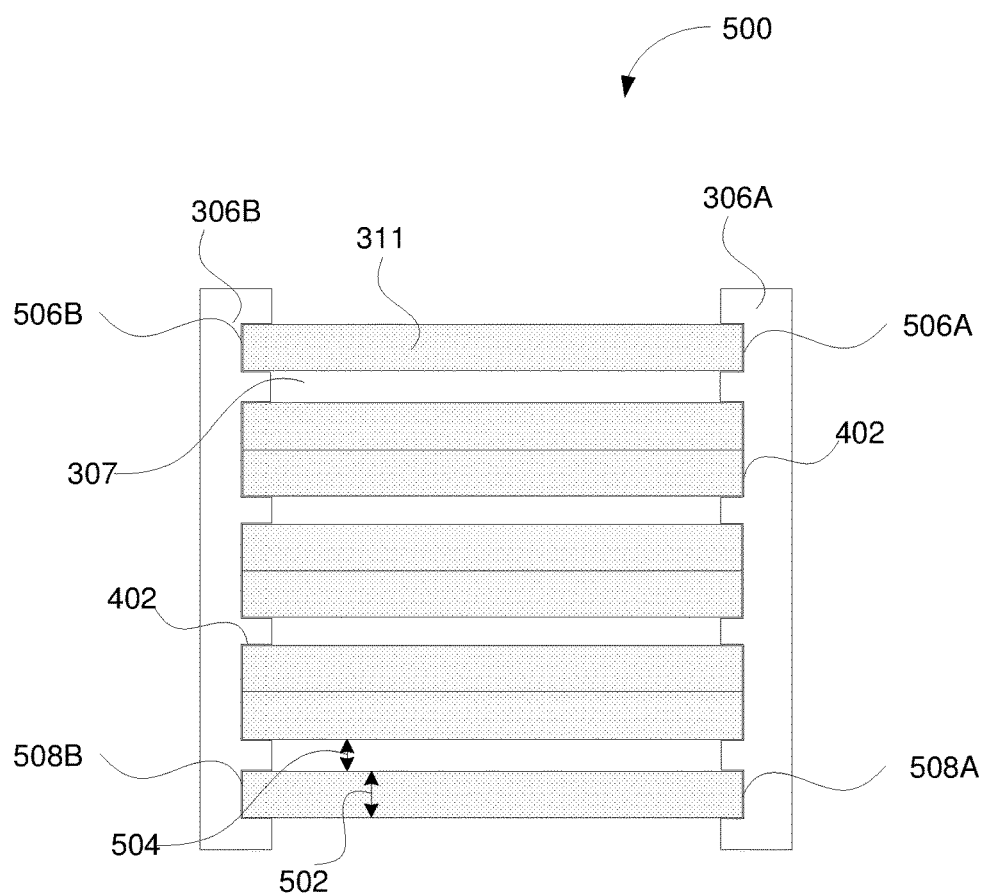
FIG. 5 is a cross-section view of a portion of the winding system according to some aspects of the present disclosure.

Furthermore, in some embodiments, the protrusions/slots in the inner and outer supports may be substantially equally spaced such that the gaps/channels 307 between the turns of the conductor 311 are equal, whereas in other embodiments, the slots 402 are not equally spaced, such as that shown in FIG. 5. By introducing gap/channels between the turns of a winding, although the winding can be effectively cooled allowing it to operate at the higher current density (and therefore lower weight), the packing factor of the winding is reduced, thereby potentially increasing the size of the machine. To balance these factors, the size and configuration of the gaps/channels between the turns of the windings are determined so as to optimize the packing factor and the weight of the machine whilst keeping reasonable efficiency. In some embodiments, the ratio of turn thickness 502 and channel thickness 504 may be 1:1. In other embodiments, the ratio may be less than 1:1, for example in the range between 1:1 and 1:10, such as 1:2, 1:3, 1:4, 1:5, 1:6, 1:7, 1:8, 1:9 and 1:10. In further embodiments, the ratio may be greater than 1:1, for example in the range between 1:1 and 10:1, such as 2:1, 3:1, 4:1, 5:1, 6:1, 7:1, 8:1, 9:1 and 10:1.

In some embodiments of the disclosed winding system, the thickness of the channel 504 may be proportionate to the thickness of the turns 502. In other embodiments, the thickness of the channel 504 may be about 40-50% of the thickness of the turns 502. Thinner channels result in more densely packed windings, but cooling of the winding set is dependent on the geometry of the channel, coolant properties and flow rates. Thinner channels increase the effective aspect ratio of the cooling channel, which increases channel friction and hence increases the required pressure to pump fluid through the channels. Thinner channels also decrease the cross sectional area of the channels and thereby increase fluid velocity for the same mass flow rate, which normally leads to better cooling.

Accordingly, determination of channel geometry is an optimisation exercise trading off packing factor, channel aspect ratio, fluid flow rates and velocities as well as the channel/device length to obtain effective cooling results from the coolant while maintaining a reasonable pressure drop in the channel. However, because the surface area of the winding set in contact with the coolant is sizeably increased in the presently disclosed winding system, even sub-optimal cooling systems result in more efficient electrical devices/machines as compared to some of those that use previously known winding systems.

In terms of practical effects of varying the channel thickness—a minimum channel thickness that results in a reasonable pressure loss with the coolant being employed is desirable. The minimum channel thickness could also possibly be determined by the minimum practical mechanical structure that can be used to create the channel. Advances in construction techniques may mean that this can be reduced further eventually.

In some embodiments, the protrusions/slots are shaped to mechanically engage the narrow edges 312 and 314 of the winding. For example, in case of protrusions, the protrusions may be shaped as elongate brackets to hold the narrow edges of the conductor 311. In case of slots, the slots may be dimensioned such that the narrow edges of the conductor 311 can snugly fit in the slots and the depth of the slots can be configured such that a minimum area of the conductor fits into the slot. The winding support may be formed of insulating, non-conducting materials that are thermally stable and chemically compatible with the coolant fluid. Examples materials include plastics such as epoxies or PEEK. The aim is to balance the fit of the winding structure so that the winding set is effectively retained but can still be assembled. The assembly of the winding set, support bobbins and core could vary considerably depending on the application. For example, the winding support is first attached to the winding set. The now supported winding set is then fitted to the core.

FIG. 4B illustrates an alternate example configuration 410 in which the turns of the winding set 302 are supported by the inner support 306A only. In this case, the outer surface of the inner winding support 306A includes slots 402 to receive the inner narrow edge 312 of the conductor at each turn. In certain embodiments of this example, the winding system 410 may include the outer coil support 306B, without slots. Alternatively, the outer coil support 306B may be entirely omitted from the winding system. FIG. 4C illustrates such an example configuration 430 in which the channel 307 extends along the outer longitudinal edges of the windings 314 as shown in FIG. 4C such that a larger portion of the windings can be in fluid contact with the coolant.

In the illustrated examples, the inner and/or outer winding supports include slots such that each turn of the conductor 311 is individually supported in an indentation, thereby creating a channel 307 between each pair of adjacent turns. In other examples, the inner and/or outer supports may include one or more slots that each accommodate multiple adjacent turns of the winding set 302 (e.g., two turns, three turns, five turns, etc.). In this case, channels 307 may be provided between some pairs of adjacent turns, but not all adjacent turns. FIG. 5 illustrates a cross section of example elongate cross-section winding set supported by inner and outer coil supports. In this example, the top and bottom coils are supported individually in slots 506A, 506B and 508A and 508B respectively, whereas two intermediate turns are supported by corresponding intermediate slots of the inner and outer winding support 306A and 306B.

It will be appreciated that FIGS. 3-5 and the corresponding description describe a few configurations of the winding system 300 according to the present disclosure. For example, in the winding system described above, the winding 302 is made of an edge-wound conductor having a rectangular cross-section. However, in other configurations and embodiments the winding may be formed of flat-wound conductors, conductors having different cross-sectional profiles (e.g., circular or square profiles), or even multiple bundled conductors (e.g., Litz wires or ribbon cables).

Similarly, although a magnetically responsive core (e.g., made of a ferromagnetic or magnetically permeable material) is depicted in FIGS. 3B and 3C, in other embodiments, a non-magnetically responsive core or an air core may be employed without departing from the scope of the present disclosure. Further still in certain electrical devices or concentrated winding machines, the housing 310 may not be required or may be shaped differently.

Cooling System

In addition to the winding system, aspects of the present disclosure include a cooling system configured to introduce a coolant in the one or more channels of the winding system 300 to conduct heat away from the exposed surfaces of the winding set 302. The cooling system may include a pump to urge coolant to flow into and out of the fluid inlet and the fluid outlet respectively.

In certain embodiments, a coolant may be introduced through the fluid inlet to enter one or more channels 307 from the curved portion of the winding set (e.g., side 302C) and flow through the channel 307 along each of the straight portions of the winding set (e.g., sides 302A and 302B) and exit from the winding from the opposite curved portion of the winding (e.g., side 302D). The coolant exiting side 302S may be collected at the fluid outlet. The collected coolant may then be directed to another fluid inlet of another winding system, or cooled before being directed to the other winding system.

As depicted in FIG. 3C, in some embodiments, the outer coil support 306B extends along a portion of the housing 310 in contact with the straight portions of the winding, but does not extend in the portion of the housing where the curved portions of the winding are placed. This provides more open volumes at either end of the housing 310 to facilitate a lower pressure drop when the coolant transitions from the fluid inlet to the channel 307. A lower pressure drop can be advantageous because for a given size of the pump, a higher fluid flow rate will be achieved, usually leading to improved cooling performance. Alternatively, for the same flow rate, a smaller pump can be used thereby reducing weight.

Any suitable coolant may be utilized. The capacity of a coolant to remove heat convectively is characterised by its convective heat transfer coefficient h in watts per square meter kelvin $W/(m^2 \cdot K)$. In order to remove more heat loss in Watts for the same temperature rise either the coefficient h or the amount of surface area over which heat is being extracted must be improved. Many times increasing h involves increasing the speed of the fluid which can quickly increase frictional losses thereby increasing the size and weight of ancillary pumps. Aspects of the present disclosure, improve the capacity of a cooling fluid to remove heat from the winding by increasing the area available over which heat is extracted (e.g., by creating gaps/channels between turns of the winding) thereby allowing fluid flows with lower h coefficients to provide efficient cooling and shortening the conductive heat path between where the heat is generated within a conductor and the exposed cooling surface.

In some embodiments, as the coolant flows in direct contact with the surface of the winding set 302 without any outer insulation, dielectric coolants may be utilized. Examples of dielectric coolants include air, distilled water, fluorinated heat transfer fluids, silicon oil, transformer oil, or mineral oil. In other embodiments, where the windings are well insulated (e.g. via thin-film insulation) and provided the coolant does not degrade the insulation, more conductive coolants such as Ethyl-Glycol-Water may be utilized. In a preferred embodiment the presence of a thin film insulation is combined with the use of dielectric coolant to improve resistance to insulation failure thereby increasing the life of the device.

Figure 6:
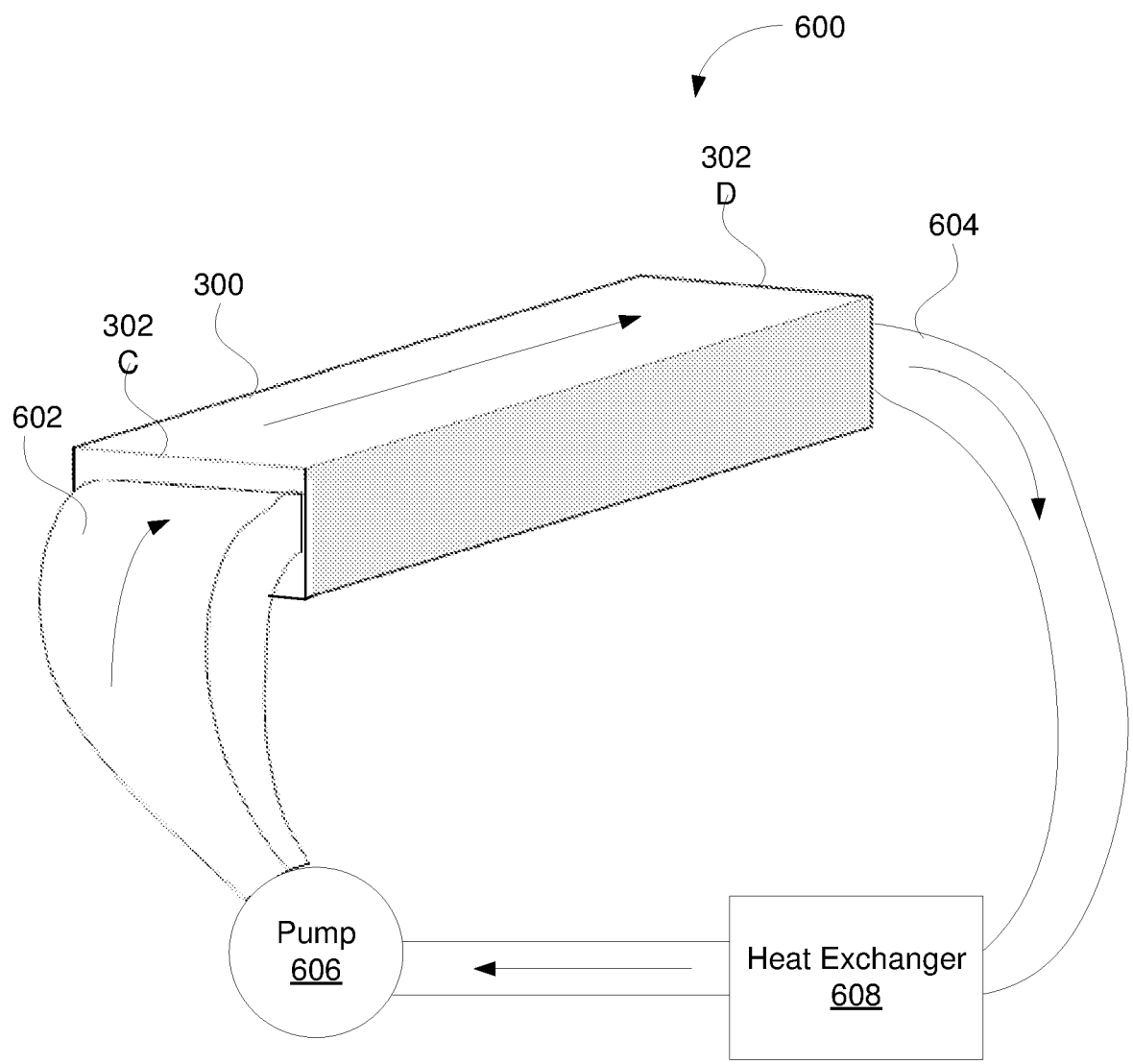
FIG. 6 illustrates an example cooling system according to aspects of the present disclosure.

FIG. 6 illustrates an exemplary cooling system 600 according to aspects of the present disclosure. The cooling system includes a pump 606 which urge a coolant fluid to into a fluid inlet 602 and out of a fluid outlet 604 of the winding system 300, each of the inlet and outlet being in fluid communication with the at least one channel 307 of the winding system 300. The cooling system 600 may include a heat exchanger 608 for cooling the coolant exiting from the at least one channel 307. The cooling system 600 may be configured to circulate the coolant fluid through the winding system 300 in a repeating manner. In some embodiments, the cooling system 600 includes a coolant distribution module (not shown), such as a manifold-type chamber, for directing coolant fluid into or out of multiple adjacent winding systems 300.

It will be appreciated that the cooling system depicted in FIG. 600 is merely an example and the specifics of the cooling system 600 will depend on the particular coolant utilized and the amount of heat dissipated by the windings.

Furthermore, the temperature of the coolant entering the channels/gaps is dependent on the amount of heat dissipated by the windings and the maximum temperature of the windings. For example, coolant temperature at the outlet 604 is dependent on how much heat has been removed from the winding system 306 and the mass flow rate of the coolant. Coolant inlet temperature, on the other hand, is limited by the maximum temperature rise that can be seen in the windings. For example if the maximum temperature in the windings is 180° C. (mostly determined by insulation life) and the temperature rise at full load is 80° C. then the maximum inlet temperature is 100° C. Cooler inlet temperatures generally mean longer device life, higher inlet temperatures generally mean smaller ancillary heat exchangers.

FIGS. 3-6 illustrate a single winding system 300 and cooling system 600. It will be appreciated that in concentrated winding machines of the type depicted in FIGS. 1 and 2, multiple winding systems 300 may be utilized, one for each pole/tooth of the stator 100 or 202. Similarly, multiple cooling systems 600 may be utilized—one for each winding. Alternatively, a single cooling system 600 may be employed such that coolant exiting from the channels of one winding system is forced to enter the channels of an adjacent winding system. In yet another embodiment a single cooling system may be employed such that the multiple winding systems 300 have a common inlet and outlet manifold that directs coolant to and from the single cooling system.

Figure 7:
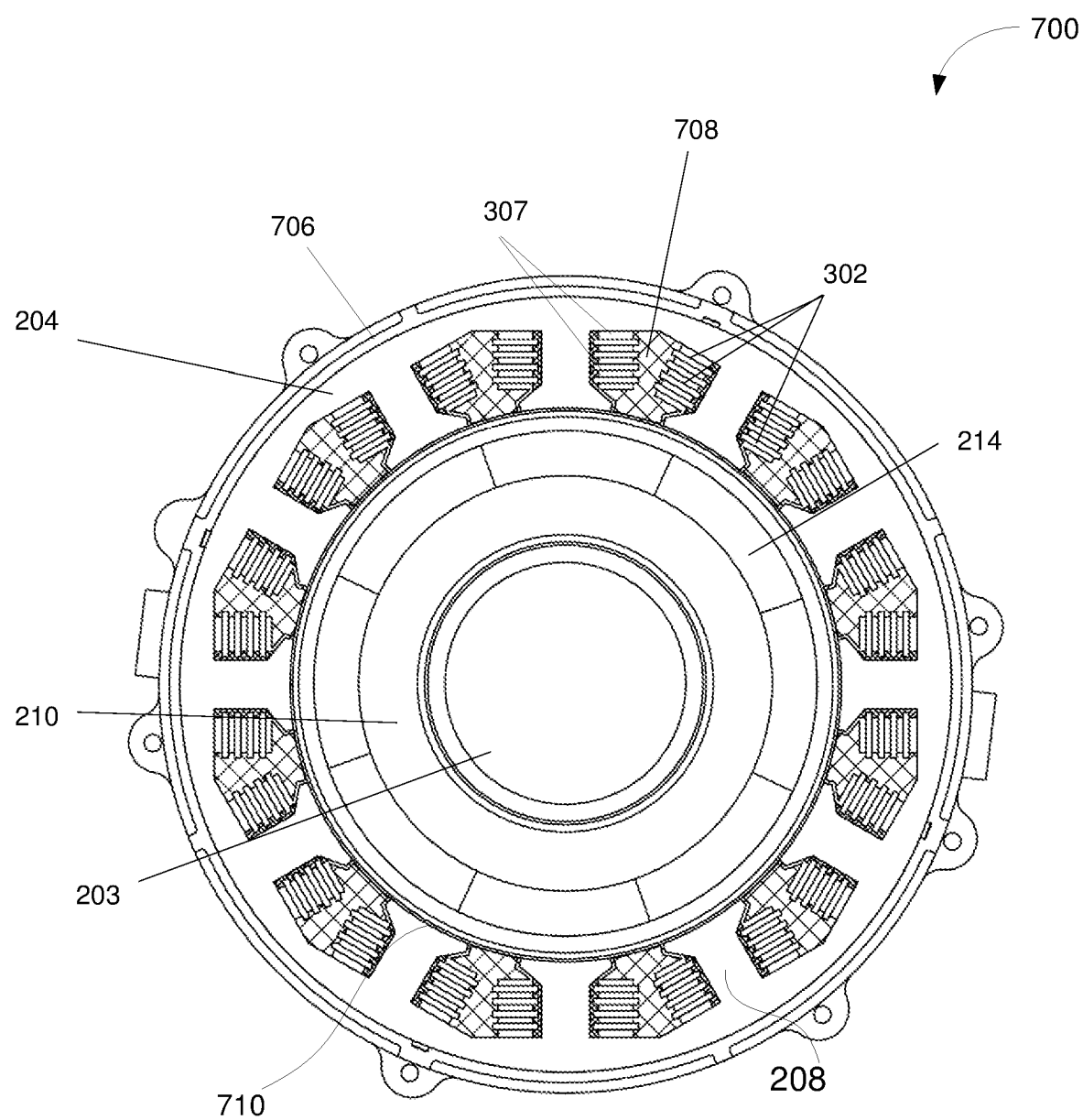
FIG. 7 illustrates an example electromagnetic device (i.e., motor or generator) with the housing disclosed in FIGS. 3-6.
Figure 8:
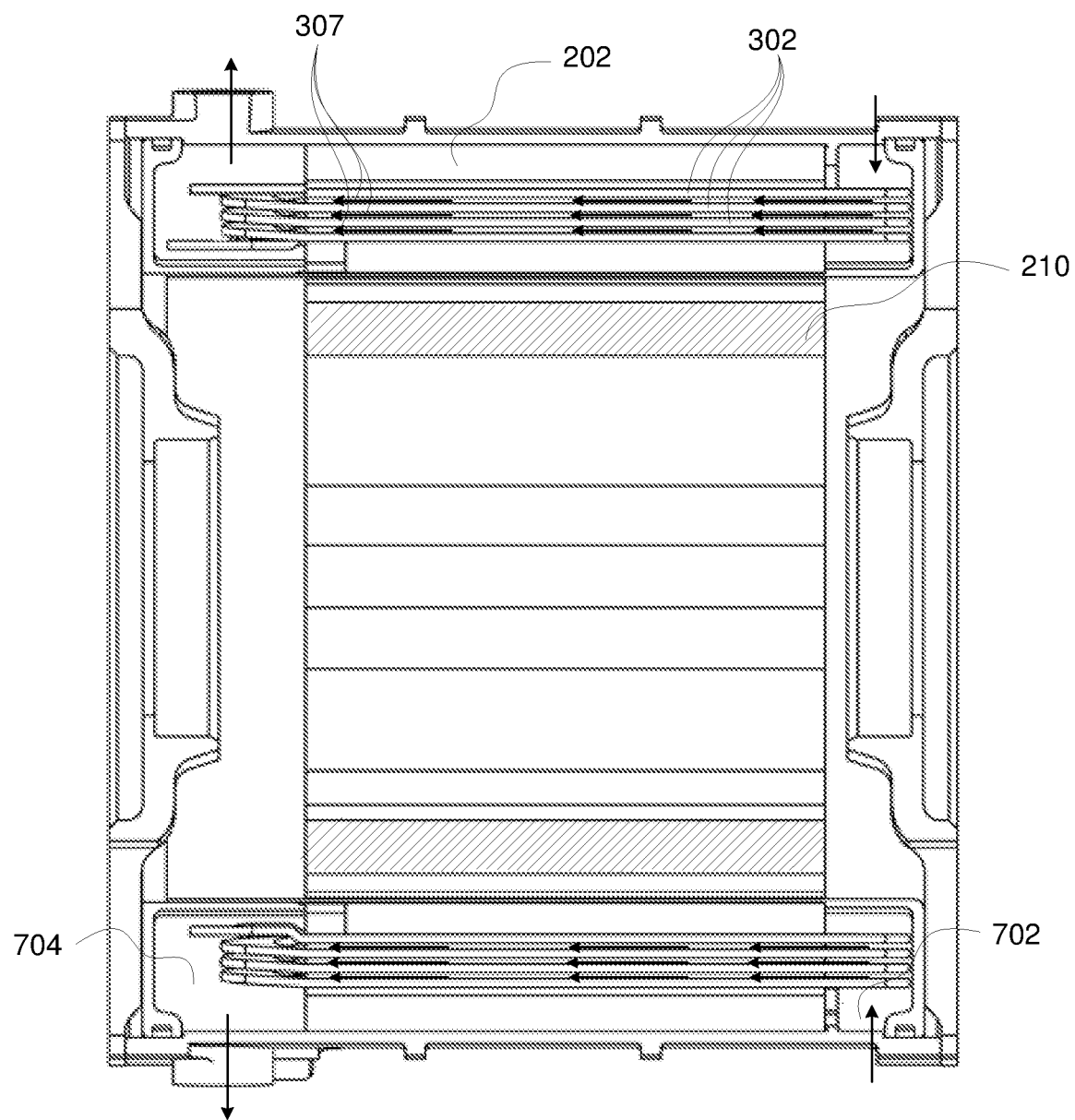
FIG. 8 illustrates a side view of the example electromagnetic device of FIG. 7.
Figure 9:
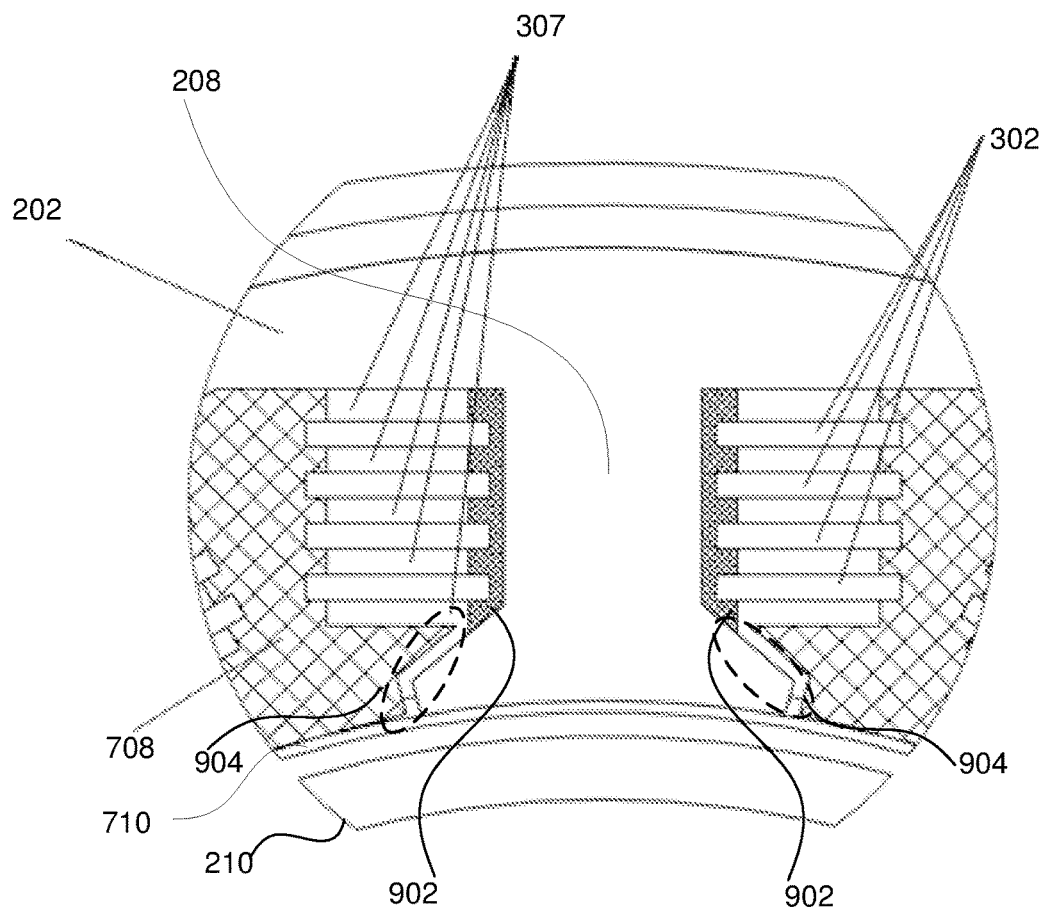
FIG. 9 is a detailed view of a stator tooth of the electromagnetic device illustrated in FIG. 7.

FIGS. 7, 8 and 9 illustrate different views of an example electromagnetic motor or generator 700 according to aspects of the present disclosure. In particular, FIG. 7 illustrates a cross section of the type of electromagnetic motor or generator 200 of FIG. 2A enclosed in a housing 706 with an example cooling system. FIG. 8 illustrates a side cross-section view of the electromagnetic motor or generator and FIG. 9 illustrates a detailed view of the windings and cooling system assembly about one stator tooth of the electromagnetic device 700. Identical reference numerals are used to indicate elements of the electromagnetic motor or generator 700 that were previously described with reference to FIGS. 2-6. However, it will be appreciated that the shape and configuration of these elements may not be identical to the shape and configuration of the corresponding elements in FIGS. 2-6.

As seen in FIGS. 7, 8 and 9, cooling channels 307 are formed between turns of current carrying windings 302 that are edge-wound around the teeth 208 of the stator 202. Furthermore, to ensure the sides of the cooling channels 307 are closed, and coolant fluid does not leak out of the channels 307 during operation, flow restricting means 708 are located in the spaces between windings of adjacent stator teeth 208. In certain embodiments, the flow restricting means 708 may be formed of non-electrically conductive material and more preferably of insulating material such as polymer, plastic, or epoxy. This flow restricting means 708 may be shaped such that cooling channels are also formed along longitudinal surfaces of the stator 204 to improve removal of heat generated within the stator core.

In order to create spaces between adjacent turns of the conductor winding 302, winding supports 306 (such as grooves, protrusions, or castellations) can be directly incorporated in the flow restricting means 708. Further, a support member 902 (e.g., a sleeve) with winding supports (e.g., grooves, protrusions, or castellations) may be fitted around each stator tooth 208. These support members 902 may be formed of insulating material similar to the material used for forming the flow restricting means 708. For example, it may be formed of insulating polymers, PEEK, resins, epoxy and/or varnish.

In certain embodiments, the flow restricting means 708 may be arranged in such a manner that the cooling channels extend along the inner radial portions of the stator teeth 208. This extension of the channels is generally indicated by reference numeral 904 in FIGS. 9 and 10. When coolant flows through the channels, it also flows through this additional area enabling heat transfer from the surfaces of the tooth tips that are exposed to the flow.

To seal these portions 904 of the channels and prevent coolant from escaping the stator, a sealing mechanism (e.g., sealing tube 710) is employed along the inner radial end of the stator 202.

Turning now to FIG. 8, the electromagnetic motor 700 also includes coolant distribution modules (e.g., inlet chamber or manifold 702 and outlet chamber or manifold 704) at either end of the electromagnetic motor 700. In operation, coolant is supplied to the cooling channels 307 via the inlet chamber 702 and heated coolant is retrieved from the cooling channels 307 via the outlet chamber 704.

The coolant distribution modules are further connected to one or more pumps 606 (for introducing coolant into the inlet chamber 702) and one or more heat exchangers 608 (for cooling down the heated coolant exiting from the outlet chamber 704).

In certain embodiments, the coolant distribution modules (e.g., the inlet and/or outlet chambers 702, 704) may be common to all the channels 307. In this case, the coolant distribution modules are annular, forming continuous radial rings at each end of the device 700 (as shown in FIG. 8). The inlet chamber 702 may have one or more inlet ports (not shown) connected to the pump 606 and the other end thereof in fluid communication with the cooling channels 307 in such a way that fluid entering the inlet port(s) is forced through the length of the cooling channels 307 surrounding each tooth 208 of the stator 200. At the other end, the fluid exits each of the channels 307 and exits the outlet chamber 704 via one or more outlet ports (not shown).

A typical fluid flow path is indicated by arrows 802. It will be appreciated that the housings referred to in FIGS. 3A to 4B are effectively replaced by the annular end housings 702A and 704A defining the inlet and outlet chambers 702, 704 and the flow restricting means 708.

In alternate embodiments, the inlet and outlet chambers 702, 704 may be radially partitioned such that multiple parallel but isolated cooling paths can exist between the inlet and outlet. This allows for partitioning and continuing partial operation in the case of one or more of the chambers leaking.

Figure 10:
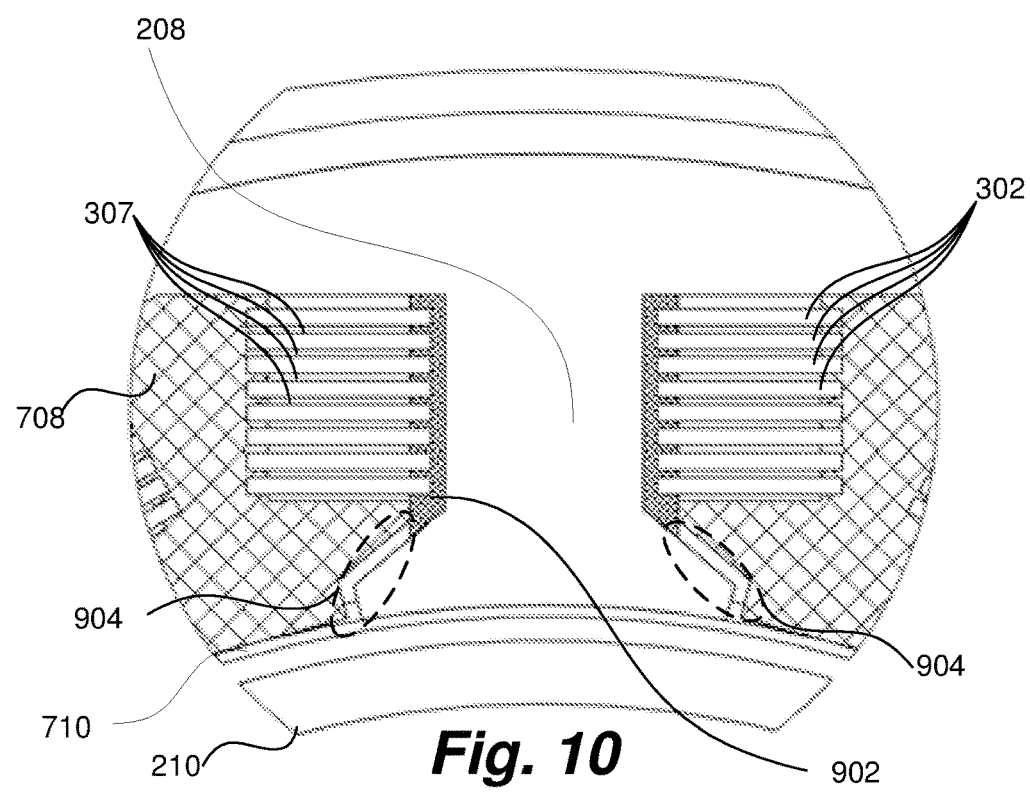
FIG. 10 is a detailed view of the stator tooth of FIG. 9 showing a winding with 8 turns.

It will be appreciated that the number of turns of the conductor winding wound around each stator tooth may vary depending on the particular implementation. For example, the windings may have between 2-20 turns per stator depending on the required power output of the electromagnetic device. FIGS. 7-9 illustrate a stator with 4 winding turns per stator tooth. FIG. 10 illustrates an alternate embodiment where the conductive winding is wound 8 times around each stator tooth creating 8 turns per stator tooth.

Now that arrangements of the present disclosure are described, it should be apparent to the skilled person in the art that the described arrangements have the following features:

- By providing channel(s) between adjacent turns from one or more winding sets and allowing a coolant to flow through the channel(s), a greater portion of the winding set may be exposed to the coolant (i.e., the surface exposed to the coolant), allowing the winding set to be potentially cooled more effectively than in some previously known techniques.
- As the conductor can be cooled more effectively, it is anticipated that higher amounts of current may be carried through the currently disclosed winding system as compared to some previously known winding systems. This in turn could allow less conductive material to be used, thereby reducing the weight of the electrical or electromagnetic machine.
- In general, motor/generator design engineers attempt to obtain maximum packing factor in the windings to reduce DC resistive losses. By providing channel(s) between turns of the windings, the present disclosed arrangements aim to effectively cool the winding sets, potentially allowing them to operate at higher current densities than is typical with windings of some other conduction cooled machines. This in turn could help reduce the volume/mass of conductive material used and hence the weight of the motor/generator.

It will be understood that the present disclosure in this specification extends to all alternative combinations of two or more of the individual features mentioned or evident from the text or drawings. Further, with minor modifications, the present disclosure is applicable to arrangements not explicitly illustrated or detailed. For example, in case of a distributed winding machine, the length of distributed winding sets, each being wound around a different tooth or different teeth, may be arranged to extend past the edge of the respective tooth or teeth to allow a coolant fluid to enter and exit the provided channels while avoiding or bypassing end portions (e.g. akin to curved portions 302C and 302D) of winding sets. In this case, a corresponding cooling system may include a coolant distribution module for directing coolant fluid into or out of multiple adjacent winding sets and the provided channels. The coolant distribution module may encapsulate the end portions which may additionally be cooled. All of these different combinations constitute various alternatives of the present disclosure.

The invention claimed is:

1. A winding system for use in a device, the system comprising:
   one or more sets of windings, each set of windings having an electrically-conductive element arranged in a winding pattern with multiple turns, each pair of adjacent turns of the multiple turns being spaced apart to at least partially define a channel between each pair of adjacent turns within a winding for coolant fluid to flow therethrough; and a housing for containing the one or more set of windings, the housing including a fluid inlet and a fluid outlet each in fluid communication with the channel between each pair of adjacent turns, the housing facilitating coolant fluid to flow from the fluid inlet to the fluid outlet via the channel between each pair of adjacent turns within the windings and in direct contact with exposed surfaces of each pair of adjacent turns, wherein the one or more sets of windings are wound around teeth that project radially inward from an inner periphery of a cylindrical stator.

2. The system of claim 1 wherein the electrically conductive element:

has a substantially elongate cross-section having a first side extending in a first dimension and a second side extending in a second dimension substantially perpendicular to the first dimension, the first side being longer than the second side; and extends in a third dimension and being edge-wound along or in a plane of the first dimension.

3. The system of claim 1 wherein the winding pattern comprises a concentrated-winding pattern, in which the multiple turns substantially fully overlap in the second dimension, or a distributed-winding pattern, in which the multiple turns only partially overlap in the second dimension.

4. The system of claim 1, wherein:

each turn of the one or more sets of windings includes two opposite straight portions; and the channel comprises two channels in separate fluid communication with the fluid inlet and the fluid outlet, each of the two channels extending along a respective one of the two straight portions.

5. The system of claim 1, further comprising a pump to urge the coolant fluid into the fluid inlet and out of the fluid outlet.

6. The system of claim 1, wherein the housing comprises a winding support having slots to support and separate the multiple turns of the one or more sets of winding.

7. The system of claim 6 wherein the winding support comprises:

an inner winding support having a first set of slots for supporting a first, inner edge of the winding; and an outer winding support having a second set of slots for supporting a second, outer edge of the winding.

8. The system of claim 7 wherein the first set of slots are deeper than the second set of slots.

9. The system of claim 1, wherein the fluid inlet or the fluid outlet comprise a widened opening to facilitate a lower pressure drop in the coolant fluid upon the coolant fluid transitioning between the fluid inlet or fluid outlet and the at least one channel.

10. The system of claim 1, wherein at least one of the electrically conductive elements arranged in a winding pattern comprises an outer insulator.

11. A method of facilitating cooling in a device, the method comprising:

arranging at least one set of windings in a winding pattern with multiple turns, each set of windings including an electrically conductive element;

spacing apart each pair of adjacent turns of the multiple turns to at least partially define at least one channel between each pair of adjacent turns for coolant fluid to flow therethrough;

containing the at least one set of windings in a housing, the housing-comprising a fluid inlet and a fluid outlet in fluid communication with the one or more channels, the housing facilitating coolant fluid to flow from the fluid inlet to the fluid outlet via the one or more channels in direct contact with exposed surfaces of each of the multiple turns in each set of windings, the exposed surfaces at least partially defining the one or more channels; and configuring the housing to facilitate coolant fluid to flow from the fluid inlet to the fluid outlet via the at least one channel between each pair of adjacent turns and to flow in direct contact with exposed surfaces of each pair of adjacent turns at least partially defining the at least one channel, wherein each set of windings are wound around teeth that project radially inward from an inner periphery of a cylindrical stator.

12. The method of claim 11, further comprising:

spacing apart at least one subset pair of adjacent turns of the multiple turns within a winding to at least partially define at least one channel between the at least one subset pair of adjacent turns for coolant fluid to flow therethrough; and configuring the housing to facilitate coolant fluid to flow from the fluid inlet to the fluid outlet via the at least one channel between the at least one subset pair of adjacent turns within the windings and in direct contact with exposed surfaces of the at least one subset pair of adjacent turns.

13. An electromechanical device, comprising:

a cylindrical stator comprising a stator core and multiple teeth projecting radially inward from an inner periphery of the stator core;

a rotor rotatably supported about a rotation axis and disposed inside the stator in opposed relation to an inner periphery of the stator with a gap;

one or more sets of windings arranged about each tooth of the stator, each set of windings including an electrically-conductive element arranged in a winding pattern with multiple turns, each pair of adjacent turns of the multiple turns being spaced apart to at least partially define at least one channel between each pair of adjacent turns for coolant fluid to flow therethrough;

an inlet coolant fluid distribution module arranged at a first end of the stator and an outlet coolant fluid distribution module arranged at a second end of the stator, the inlet and outlet coolant fluid distribution modules in fluid communication with each at least one channel such that coolant fluid entering the inlet coolant fluid distribution module is forced through each at least one channel that extends between the first end of the stator and the second end of the stator, is in direct contact with exposed surfaces of each pair of adjacent turns at least partially defining each at least one channel, and exits each at least one channel in the outlet coolant fluid distribution module.

14. The electromechanical device of claim 13, wherein the inlet coolant fluid distribution module comprises at least one inlet port and the outlet fluid distribution module comprises at least one outlet port, the inlet and outlet ports being connectable to a cooling circuit including a coolant pump for receiving coolant fluid and a heat exchanger for cooling the coolant fluid exiting the outlet port.

15. The electromechanical device of claim 14, comprising the cooling circuit having the at least one pump and the at least one heat exchanger.

16. The electromechanical device of claim 13, wherein the inlet and outlet coolant fluid distribution modules comprise annular chambers between which a plurality of the at least one channels extend.

17. The electromechanical device of claim 13, wherein the inlet fluid distribution module comprises multiple partitioned sections, each section in fluid communication with a channel portion of the stator.

18. The electromagnetic device of claim 13, wherein the outlet fluid distribution module comprises multiple partitioned sections, each section in fluid communication with a channel portion of the stator.

19. The electromechanical device of claim 13, wherein each of the stator teeth comprises a winding support having slots to support and separate the multiple turns of the one or more sets of windings.

20. The electromechanical device of claim 13, further comprising a flow restricting means positioned between adjacent sets of windings to confine coolant flow to the one or more channels.

21. The electromechanical device of claim 20, wherein the flow restricting means comprises a winding support to support and separate the multiple turns of the one or more sets of windings.

22. The electromechanical device of claim 13, further comprising multiple magnets disposed on an outer surface of the rotor.

23. The electromechanical device of claim 13, further configured such that coolant fluid flows from the fluid inlet to the fluid outlet via multiple channels at least partially formed between multiple turns in each set of windings and in direct contact with each of the multiple turns in each set of windings.

24. The electromechanical device of claim 13, wherein at least one subset pair of adjacent turns of the multiple turns in a winding is spaced apart to at least partially define a channel between the at least one subset pair of adjacent turns for coolant fluid to flow therethrough; and the inlet and outlet coolant fluid distribution modules in fluid communication with the channel between the subset pairs of adjacent turns such that coolant fluid entering the inlet coolant fluid distribution module is forced through the channel between the at least one subset pair of adjacent turns within the windings, is in direct contact with exposed surfaces of the at least one subset pair of adjacent turns, and exits each at least one channel in the outlet coolant fluid distribution module.

25. The electromechanical device of claim 13, wherein the electrically conductive element arranged in a winding pattern comprises an outer insulator.

* * * * *